United States Patent
Papin et al.

(10) Patent No.: US 8,953,413 B2
(45) Date of Patent: Feb. 10, 2015

(54) METHOD AND DEVICE FOR SCARING BIRDS ACOUSTICALLY, IN PARTICULAR FOR AN AIRCRAFT

(71) Applicants: Airbus Operations SAS, Toulouse (FR); Universite Rennes 1, Rennes (FR); Centre National de la Recherche Scientifique, Paris (FR)

(72) Inventors: Nathalie Papin, Toulouse (FR); Frederic Sebe, Theys (FR); Thierry Aubin, St. Lucien (FR)

(73) Assignees: Airbus Operations SAS (FR); Universite Rennes 1 (FR); Centre National de la Recherche Scientifique (CNRS) (FR)

( * ) Notice: Subject to any disclaimer, the term of this patent is extended or adjusted under 35 U.S.C. 154(b) by 0 days.

(21) Appl. No.: 14/358,160

(22) PCT Filed: Nov. 15, 2012

(86) PCT No.: PCT/FR2012/052635
§ 371 (c)(1),
(2) Date: May 14, 2014

(87) PCT Pub. No.: WO2013/072632
PCT Pub. Date: May 23, 2013

(65) Prior Publication Data
US 2014/0293750 A1    Oct. 2, 2014

(30) Foreign Application Priority Data
Nov. 18, 2011   (FR) ..................................... 11 60546

(51) Int. Cl.
*A01M 29/16*   (2011.01)
*G10K 15/02*   (2006.01)

(52) U.S. Cl.
CPC .................................... *A01M 29/16* (2013.01)
USPC ......................................................... 367/139

(58) Field of Classification Search
CPC ....................................................... A01M 29/16
USPC ........................................................ 367/139
See application file for complete search history.

(56) References Cited

U.S. PATENT DOCUMENTS

| 3,594,786 A | 7/1971 | Brunner-Schwer et al. |
| 6,993,867 B2 * | 2/2006 | Toyota ............................ 43/124 |
| 2004/0093788 A1 * | 5/2004 | Toyota ............................ 43/124 |
| 2013/0014692 A1 * | 1/2013 | Lee .............................. 116/22 A |

FOREIGN PATENT DOCUMENTS

| FR | 2 599 175 A1 | 11/1987 |
| GB | 2192300 A | 1/1988 |
| GB | 2323009 A * | 9/1998 ............ A01M 29/02 |

(Continued)

OTHER PUBLICATIONS

Int'l Search Report (Feb. 15, 2013) PCT/FR2012/052635.

*Primary Examiner* — Daniel Pihulic
(74) *Attorney, Agent, or Firm* — Lerner, David, Littenberg, Krumholz & Mentlik, LLP

(57) ABSTRACT

A device for acoustically scaring avian species includes means for emitting an acoustic sequence including the repetition of a combination of at least three categories of different synthetic signals, including warning signals representative of alert noises from birds of prey, interspecies distress signals, and taking-flight signals from various species representing beatings of wings.

11 Claims, 1 Drawing Sheet

(56) References Cited

FOREIGN PATENT DOCUMENTS

| | | | |
|---|---|---|---|
| JP | 2002 159257 A | 6/2002 | |
| WO | 97/29633 A1 | 8/1997 | |
| WO | 2006/114300 A1 | 11/2006 | |
| WO | 2010/023253 A1 | 3/2010 | |

* cited by examiner

METHOD AND DEVICE FOR SCARING BIRDS ACOUSTICALLY, IN PARTICULAR FOR AN AIRCRAFT

CROSS-REFERENCE TO RELATED APPLICATIONS

The present application is a national phase entry under 35 U.S.C. §371 of International Application No. PCT/FR2012/052635, filed Nov. 15, 2012, published in French, which claims priority from French Application No. 1160546, filed Nov. 18, 2011, all of which are incorporated herein by reference.

The present invention relates to a method and to a device for acoustically scaring avian species.

The object of such a device is to repel avian species from sensitive zones of human activity by generating acoustic signals.

Although not exclusively, the present invention can be applied in particular to the acoustic scaring of avian species at airports, using a system operated on the ground or using a system on board an aircraft, to limit avian collisions with aircraft.

Acoustic scaring devices are therefore apparatuses which produce sounds intended to frighten birds. Currently, there are three main types of scaring method, namely the use of detonators (gas canons), the broadcasting of obstruction signals and the broadcasting of distress signals.

Document FR-2 599 175 discloses a method for synthesising sounds which mirror animal calls and are used by scaring devices.

The digital signals broadcast in this case fall within two categories: distress signals and obstruction signals, which are used separately. The distress signals currently used at airports in France and in Europe are high-intensity warning signals which prompt the birds to approach the source of the sound and to disperse into the distance immediately thereafter. As for the obstruction signals, these amount to an acoustic "barrier" that brings about auditory discomfort that prevents the birds from entering a determined zone.

The two main problems with conventional acoustic scaring methods are that:
  either the target species soon become accustomed thereto, thereby very quickly rendering the method ineffective (in the case of the detonators);
  or these methods target only a limited number of avian species.

Thus, currently used scaring devices based on distress signals have no effect on many European species, such as birds of prey (which account for over 30% of collisions), but also on non-European species (South American, Asian and African).

In addition, South America, Asia and Africa are set to be subjected to an increase in air traffic, which should lead to a considerable increase in the likelihood of avian collisions with new species in these regions.

Moreover, it is known that, particularly for cost reasons, many airports lack the current scaring means and techniques (acoustic or otherwise) which are used at other airports.

The present invention aims to overcome the aforesaid drawbacks. It relates to a particularly effective method for acoustically scaring avian species.

Therefore, according to the invention, said method in which:
a) at least one acoustic sequence is generated; and
b) this acoustic sequence is emitted in the form of acoustic waves, is distinctive in that in step a), in a single acoustic sequence, the repetition of a combination of at least three different categories of synthesised signal is generated, comprising warning signals from birds of prey, interspecific distress signals and taking-flight signals from various species.

Within the scope of the present invention, said acoustic sequence is made up of synthesised signals containing warning, distress and taking-flight information. When synthesising these signals, only the useful information (warning, distress and taking-flight) is kept, as set out above. These signals are thus not mere synthesised copies of natural signals.

Thus, the present invention provides for the broadcast within the same acoustic sequence of (at least) three signal categories, the particular concatenation of which biologically triggers a heightened state of stress in the birds, as set out below. This emission of combined signals leads to faster, more intense and more effective behavioural responses (in terms of the speed of taking flight and of dispersion into the distance) than with the currently used single specific signals, and is effective against a far higher number of avian species.

The method according to the present invention therefore provides for sequential concatenation of synthesised acoustic signals which is effective on many birds. In particular, said method can be used to make birds take flight from zones where their presence proves to be harmful or dangerous in relation to human activities, and in particular at airports.

This combination of acoustic scaring signals (namely, in succession, warning signals from birds of prey, interspecific distress signals and taking-flight signals for various species) within a single sequence is more effective in both qualitative (taking-flight, dispersion) and, particularly, quantitative terms (there is the potential to scare far more species with said combination) than the conventional solutions.

Advantageously, the signals used in the sequence are formed by acoustic synthesis based on models of natural signals, and this makes it possible to retain and amplify their biological warning value.

The precise choice of these signals and of their combination means that as many different species as possible from across the globe can be scared, without prior identification. The invention has been successfully tested in Europe, Asia, South America and Africa.

In a preferred embodiment:
  the signals from birds of prey are synthesised distress signals from a black kite;
  the interspecific signals are distress signals synthesised from the features that are common to the natural distress signals of starlings, lapwings, Corvidae and Laridae; and
  the taking-flight signals are beatings of Colombidae wings.

Preferably, said sequence has a predetermined duration, for example of one minute, over the course of which each signal category is broadcast for an equal amount of time, for example a few seconds, the intended signal categories being broadcast in succession in a loop.

The present invention provides for a particular order for the combination which means that the highest possible number of species can be scared without them necessarily having to be identified. In addition, advantageously, auxiliary signals which are effective on a given avian species can be introduced into said sequence.

Furthermore, advantageously, at least one of the following modifications can be made to said acoustic sequence:
  a modification to the duration of the signals;
  a modification to the duration of the silent periods between successive signals; and
  a modification to their relative positions within the sequence.

This makes it possible to perfect the sound sequence, in particular as knowledge improves and depending on the situation encountered (target species, country).

The present invention also relates to a device for acoustically scaring avian species, comprising means for emitting an acoustic sequence in the form of acoustic waves.

According to the invention, said device is distinctive in that said emission means emit an acoustic sequence comprising the repetition of a combination of at least three different signal categories comprising warning signals from birds of prey, interspecific distress signals and taking-flight signals from various species.

Furthermore, advantageously, said device may also have means for remotely triggering the emission of an acoustic sequence.

The device according to the invention, comprising:
means for storing and managing the acoustic sequence;
means (loudspeakers) for emitting this acoustic sequence in the form of acoustic waves; and
means for triggering said emission,
may be a device provided on the ground, having emission means which are mounted at a fixed position or so as to be movable, or a device on board an aircraft.

In this last application, the scaring device is separate from the local airport installations and can therefore be used at airports lacking avian scaring and deterrent equipment.

The present invention additionally relates to an aircraft, in particular a transport aeroplane, having a device of the aforementioned type.

In this case, in a preferred embodiment, the emission means (loudspeakers) are arranged at the nose landing gear of the aircraft so as to be:
located inside the fuselage of the aircraft when said landing gear is retracted; and
moved when the landing gear extends so as to be outside, while being directed towards a zone to be safeguarded when said landing gear is fully extended.

The acoustic scaring device is thus used in the same flight phases as those for which the landing gear is extended. It thus has no negative aerodynamic impact on the rest of the flight, once the landing gear has been retracted again.

This acoustic scaring device may be a separate device from the aircraft. However, in a particular embodiment, said device forms part of a conventional ground crew call system fitted to the aircraft.

The figures of the accompanying drawings will illustrate how the invention can be carried out. In these figures, identical references denote like elements.

Figure 1:
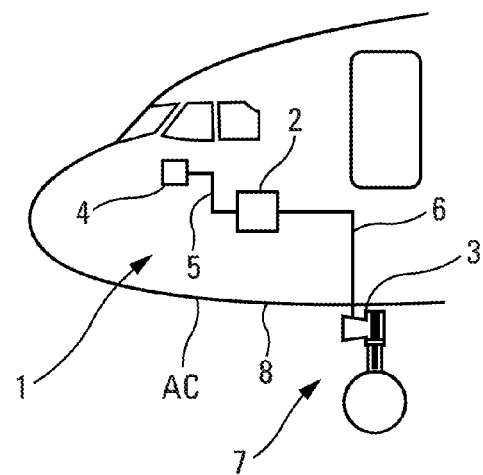
FIG. 1 shows, in a schematic view, a device according to the invention, in a particular application.

The device 1, according to the invention, is shown schematically in FIG. 1 and is a device for acoustically scaring avian species. The object of this device 1 is to repel avian species from sensitive zones of human activity by generating acoustic signals.

Although not exclusively, the device 1 can be used in particular to scare avian species at airports, through being used on the ground or through being brought on board an aircraft AC, in particular a transport aeroplane, in order to limit avian collisions with aircraft, as shown by way of (non-limiting) illustration in FIG. 1.

For this purpose, said device 1 comprises:
means 2 for storing and managing an acoustic sequence that is used, as set out above;
means 3 (at least one loudspeaker) which are connected by means of a connection (an electrical connection) 6 to said means 2 and which are formed so as to emit this acoustic sequence, in the conventional manner, in the form of acoustic waves; and
means 4 for triggering such an emission which are connected by means of a connection (an electrical connection) 5 to said means 2.

According to the invention, said emission means 3 emit an acoustic sequence comprising the repetition of a combination of at least three different categories of signal, comprising warning signals from birds of prey, interspecific distress signals and taking-flight signals from various species. This acoustic sequence is made up of synthesised signals containing warning, distress and taking-flight information. In these synthesised signals, only the useful information (warning, distress, taking flight) is kept.

Thus, the device 1 according to the invention provides for the broadcast within the same acoustic sequence of at least three signal categories, the particular concatenation of which biologically triggers a heightened state of stress in the birds, as set out below. This emission of combined signals leads to faster, more intense and more effective behavioural responses (in terms of the speed of taking flight and of dispersion into the distance) than with the currently used specific signals, and is effective against a far higher number of avian species.

This combination of acoustic scaring signals within a single sequence is therefore more effective in both qualitative (taking flight, dispersion) and, particularly, quantitative terms (there is the potential to scare far more species using said combination) than the conventional solutions.

In a preferred embodiment, the signals used in the sequence are formed by acoustic synthesis based on models of natural signals, and then recorded on a conventional storage means (not shown) of said means 2. Such formation by acoustic synthesis allows the signals to retain their biological warning value while eliminating non-informative intrasignal noise.

The present invention also proposes a particular order for the combination (namely, in succession, warning signals from birds of prey, interspecific distress signals and taking-flight signals from various species) which (together with the choice of these signals) means that as many species as possible from across the globe can be scared using a single signal, without them necessarily having to be identified.

Preferably, said sequence has a predetermined duration, for example of one minute, over the course of which each signal category is broadcast for the same length of time, for example a few seconds, the different signal categories being broadcast (in succession) in a loop (over the course of this predetermined duration).

Thus, aside from the fact that each signal is interpreted by the various species as a warning of imminent danger, it is also the particular concatenation which biologically triggers a heightened state of stress in the birds, prompting them to quickly leave the emission zone. Similarly, the inclusion of signals from birds of prey reduces approaches and accelerates dispersion. Lastly, the inclusion of non-specific taking-flight signals (namely wing sounds) heightens the state of stress and causes many groups of birds to take flight which may not necessarily respond specifically to distress or warning signals. The behavioural response to the combined signals is therefore more intense and more effective than for similar specific signals which are currently used in isolation. It has been found that the speeds at which scared birds take flight and disperse and the proportion of birds that are scared following the broadcast of the combined signals are greater than observed during the broadcast of distress signals that are used in isolation.

Figure 2:
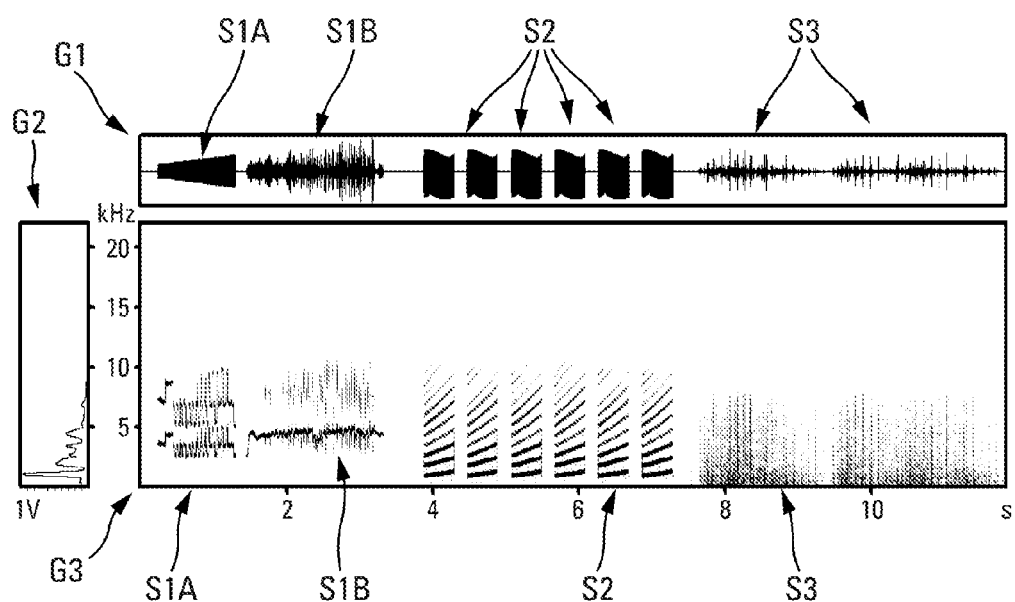
FIG. 2 is a graph setting out a preferred signal combination.

The preferably used combination is therefore a combination of warning signals from birds of prey, interspecific distress signals and non-specific taking-flight signals, as shown in FIG. 2. FIG. 2 comprises three graphs G1, G2 and G3 showing, respectively, a time/amplitude diagram, an amplitude/frequency diagram and a time/frequency diagram for the preferred combination of the signals used, time being expressed in seconds (s), frequency in kilohertz (kHz) and amplitude in volts (V). The combined signal lasts for one minute: over the course of this minute, two signals from birds of prey S1A and S1B are broadcast for four seconds, followed by interspecific signals S2 for four seconds, followed by sounds S3 of beating wings for four seconds, and so on until the minute is over. This signal can last longer (that is, it can be repeated) if deemed useful, for example so as to be emitted throughout a flight phase of an aircraft AC if the device 1 is on board an aircraft AC.

In a preferred embodiment:

the signals from birds of prey S1A and S1B are synthesised distress signals from a black kite. The frequency band of these signals is in the range from 2.4 kHz to 10 kHz. The signal is a complex signal comprising harmonics and a mean fundamental frequency of 2.6 kHz with a frequency modulation of 1.25 kHz over 0.02 seconds;

the interspecific signals S2 are distress signals synthesised from the features that are common to the natural distress signals of starlings, lapwings, Corvidae and Laridae. The frequency band of these signals is in the range from 850 Hz to 9.5 kHz. The signal is a complex signal comprising harmonics and a mean fundamental frequency of 1 kHz with an increasing frequency modulation of 350 Hz over the duration of the 0.42-second signal; and the taking-flight signals S3 are beatings of Colombidae wings. The sound is a pulsed sound (80 pulses in 4 seconds). These pulses having a wide frequency band (of from 100 Hz to 7 kHz) come from syntheses of wing sounds emitted by more than three individuals.

The precise choice of these signals and of their combination means that as many different species as possible from across the globe can be scared, without prior identification. These signals have been successfully tested in Europe, Asia, South America and Africa.

The particular order for the combination in question (namely, in succession, warning signals from birds of prey, interspecific distress signals and taking-flight signals from various species) means (together with the choice of these signals) that as many species as possible from across the globe can be scared using a single sequence, without them necessarily having to be identified. This order in which to broadcast the signals in the sequence is crucial: the sequence has biological significance. This is because the animals first receive warning information (alerting them that a predator is approaching and putting them in a state of stress), then distress information indicating that one or more individuals have been captured (heightening the state of stress) and finally taking-flight information, compelling them to take immediate flight from the area of signal broadcast. This particular successive order for the signals therefore considerably heightens the state of stress of the birds and makes as many different species as possible take flight, even species (such as pigeons and ibis) on which the warning or distress signals broadcast in isolation by conventional scaring systems were ineffective.

Moreover, it will be noted that:

the acoustic signals making up the sequence are certainly not natural warning, distress or taking-flight signals (emitted by birds), but signals that have been produced entirely by acoustic synthesis on a computer. These signals simply borrow from natural signals an encoding of warning, distress and taking-flight information, respectively, in terms of frequency modulations and in spectral terms. These synthesised signals have been freed of the non-encoding intrasignal sounds in the natural signals. As a result, these synthesised signals are more effective at scaring than corresponding natural signals (the birds are dispersed more intensely and further afield). In addition, compared with natural signals, the levels of intensity of the highest-pitched harmonic frequencies have been reinforced, making them more penetrative and capable of propagating further afield, thereby increasing their signal to noise ratio and their efficiency range in terms of distance; and the synthesised signals provided in the sequence are far more interspecific than natural signals, since they can be formed by codes that are common to a large number of bird species (for example, more than fifty species) both in terms of warning information and distress information.

Moreover, in a particular embodiment, auxiliary (additional) signals which are effective on a given avian species are introduced into said sequence.

Furthermore, at least one of the following modifications can be made to said acoustic sequence:

a modification to the duration of the signals;

a modification to the duration of the silent periods between two successive signals; and a modification to their relative positions within the sequence (order in which the signals appear).

These last features make it possible to perfect the sound sequence, in particular as knowledge improves and depending on the situation encountered (target species, country).

Within the scope of the present invention, said device 1 may be:

a device that is provided on the ground, having emission means 3 (loudspeakers) that are either mounted at a fixed position or detachable, and are arranged in sensitive zones of human activity, in particular at an airport, preferably in the vicinity of a runway; or a device on board an aircraft AC.

Furthermore, the triggering means 4 can be formed so as to allow remote triggering of the emission of an acoustic sequence.

When used at an airport, the device 1 can be used to broadcast the combined signals, over the course of one minute for example, when there are birds on or at the edges of the take-off and landing runways. The signals are emitted from loudspeakers on board a vehicle or from loudspeakers positioned along the runways. The average intensity at which these signals are to be emitted has to be approximately 100 dBSPL when measured one meter from the loudspeakers.

The emission of combined signals can also be remote-controlled and brought about from detachable autonomous means arranged in the vicinity of a runway. The area covered by the signal depends on the characteristics of the emission means 3 and on meteorological conditions.

If the device 1 is on board an aircraft AC, as shown in FIG. 1, the scaring device is independent of the local airport installations and can therefore be used (but not exclusively) at airports lacking avian scaring and deterrent equipment, in particular in order to limit avian collisions.

In this case, the pilot can trigger the scaring device (using the means 4) before take-off or when approaching an airport, where it is suspected that birds will pose a danger, without having to know the local species to be scared. At most, the pilot will need to select the signals on the basis of the airport in question, for example by broad geographical zone (scaring signals by continent).

Broadcast of the signals during the taxi phase first of all makes it possible to safeguard the runway before take-off. Lastly, broadcast of the combined signal during the initial take-off phase and final landing phase (below 1500 feet) makes it possible to limit collisions in these phases of flight (which account for 70% of collisions, the most serious taking place upon take-off).

In a preferred embodiment, shown in FIG. 1, the triggering means 4 are installed at the cockpit of the aircraft AC. In addition, the emission means 3 (loudspeakers) are arranged at the nose landing gear 7 of the aircraft AC so as to be:
- located inside the fuselage 8 of the aircraft AC when said landing gear 7 is retracted; and
- moved when the landing gear 7 extends so as to be outside (the fuselage), while being directed towards a zone to be safeguarded, preferably towards the nose of the aircraft AC, when the landing gear 7 is fully extended.

The emission means (loudspeakers) can be arranged at the housing of the nose gear 7 or directly on said nose gear 7, as shown in FIG. 1.

The acoustic scaring device 1 is thus used in the same phases of flight as those for which the nose landing gear 7 is extended. It thus has no negative impact on the rest of the flight, once the nose landing gear 7 has been retracted again.

In addition, the pointed positioning of the loudspeaker 3 makes it possible to optimise the effectiveness of the signal directed towards the nose of the aircraft AC and to minimise the disturbance from other sources of sound of the aircraft AC, such as engines, movable surfaces or the main landing gears.

The acoustic scaring device 1 may, in this case, be an independent device. However, it may also be integrated within existing avionics systems. Thus, in a particular embodiment, said device 1 forms part of a conventional ground crew call system fitted to the aircraft AC. This conventional system is installed at the housing of the nose gear 7 and is activated from the cockpit to alert ground crew where necessary. This system can thus incorporate the functionalities for scaring birds using sound, according to the invention, as set out above.

The invention claimed is:

1. A method for acoustically scaring avian species, the method comprising:
   generating at least one acoustic sequence; and
   emitting the acoustic sequence in the form of acoustic waves,
   wherein, in a single acoustic sequence, a repetition of a combination of at least three different categories of synthesised signal is generated, comprising, in succession,
   warning signals from birds of prey, which warning signals are synthesised distress signals from a black kite,
   interspecific distress signals, which distress signals are distress signals having been synthesised from the features that are common to the natural distress signals of starlings, lapwings, Corvidae and Laridae, and
   taking-flight signals from a plurality of species, which signals represent beatings of Colombidae wings.

2. The method according to claim 1, further comprising additionally introducing auxiliary signals which are effective on a given avian species into said sequence.

3. The method according to claim 1, wherein said signals are formed by acoustic synthesis based on models of natural signals.

4. The method according to claim 1, wherein at least one of the following modifications is made to said acoustic sequence:
   a modification to the duration of the signals;
   a modification to the duration of the silent periods between successive signals; and
   a modification to the relative positions of the signals within the sequence.

5. The method according to claim 1, wherein said sequence has a predetermined duration, over the course of which each signal category is broadcast for the same length of time, said signal categories being broadcast in succession in a loop.

6. The method according to claim 1, wherein the acoustic sequence is emitted in the form of acoustic waves by emission means arranged at the nose landing gear an aircraft so as to be:
   located inside the fuselage of the aircraft when said landing gear is retracted; and
   moved when the landing gear extends so as to be outside while being directed towards a zone to be safeguarded, when the landing gear is fully extended.

7. A device for acoustically scaring avian species, comprising:
   means for emitting an acoustic sequence in the form of acoustic waves, said emission means emitting an acoustic sequence comprising the repetition of a combination of at least three different signal categories, comprising, in succession,
   warning signals from birds of prey, which warning signals are synthesised distress signals from a black kite,
   interspecific distress signals, which distress signals are distress signals having been synthesised from the features that are common to the natural distress signals of starlings, lapwings, Corvidae and Laridae, and
   taking-flight signals from a plurality of species, which signals represent beatings of Colombidae wings.

8. The device according to claim 7, comprising means for remotely triggering the emission of an acoustic sequence.

9. An aircraft, comprising an acoustic scaring device comprising:
   means for emitting an acoustic sequence in the form of acoustic waves, said emission means emitting an acoustic sequence comprising the repetition of a combination of at least three different signal categories, comprising, in succession,
   warning signals from birds of prey, which warning signals are synthesised distress signals from a black kite,
   interspecific distress signals, which distress signals are distress signals having been synthesised from the features that are common to the natural distress signals of starlings, lapwings, Corvidae and Laridae, and
   taking-flight signals from a plurality of species, which signals represent beatings of Colombidae wings.

10. The aircraft according to claim 9, wherein said emission means of the acoustic scaring device are arranged at the nose landing gear of said aircraft so as to be:
    located inside the fuselage of the aircraft when said landing gear is retracted; and
    moved when the landing gear extends so as to be outside while being directed towards a zone to be safeguarded, when the landing gear is fully extended.

11. The aircraft according to claim 9, wherein said acoustic scaring device forms part of a ground crew call system fitted to said aircraft.

* * * * *